US012621146B2

(12) United States Patent
Okuda et al.

(10) Patent No.: US 12,621,146 B2
(45) Date of Patent: May 5, 2026

(54) PROGRAM EXECUTION SYSTEM, DATA PROCESSING APPARATUS, PROGRAM EXECUTION METHOD, AND PROGRAM

(71) Applicant: NTT, Inc., Tokyo (JP)

(72) Inventors: Tetsuya Okuda, Tokyo (JP); Kenji Umakoshi, Tokyo (JP)

(73) Assignee: NTT, Inc., Tokyo (JP)

( * ) Notice: Subject to any disclaimer, the term of this patent is extended or adjusted under 35 U.S.C. 154(b) by 136 days.

(21) Appl. No.: 18/834,381

(22) PCT Filed: Mar. 2, 2022

(86) PCT No.: PCT/JP2022/008932
§ 371 (c)(1),
(2) Date: Jul. 30, 2024

(87) PCT Pub. No.: WO2023/166625
PCT Pub. Date: Sep. 7, 2023

(65) Prior Publication Data
US 2025/0132912 A1    Apr. 24, 2025

(51) Int. Cl.
*H04L 9/14*          (2006.01)
*H04L 9/08*          (2006.01)
*H04L 9/30*          (2006.01)

(52) U.S. Cl.
CPC ................ *H04L 9/14* (2013.01); *H04L 9/088* (2013.01); *H04L 9/30* (2013.01)

(58) Field of Classification Search
CPC .............. H04L 9/14; H04L 9/088; H04L 9/30
See application file for complete search history.

(56) References Cited

U.S. PATENT DOCUMENTS

| | | | |
|---|---|---|---|
| 12,067,119 B1 * | 8/2024 | Brandwine | ......... G06F 9/45558 |
| 2021/0328787 A1 * | 10/2021 | Grieder | ............... H04W 12/086 |

FOREIGN PATENT DOCUMENTS

| | | | | |
|---|---|---|---|---|
| EP | 4064090 A1 * | 9/2022 | ......... | G06F 21/6218 |
| EP | 4145762 A1 * | 3/2023 | ............... | H04L 9/30 |
| GB | 2610861 A * | 3/2023 | ........... | H04L 9/3066 |

OTHER PUBLICATIONS

Microsoft Azure Confidential Computing, official website, "What is confidential computing?", https://docs.microsoft.com/ja-jp/azure/confidential-computing/overview, May 22, 2024.
Google Confidential VM, official website, https://cloud.google.com/compute/confidential-vm/docs?hl=ja, viewed Mar. 2, 2022.

* cited by examiner

*Primary Examiner* — Hee K Song
(74) *Attorney, Agent, or Firm* — IPUSA, PLLC

(57) ABSTRACT

A program execution system includes a data processing apparatus that performs secret calculation in a secure area. The data processing apparatus includes circuitry configured to calculate a result that is obtained by executing a program on data in the secure area, the program being obtained by decrypting a re-encrypted program with a first secret key, and the data being obtained by decrypting re-encrypted data with a second secret key.

8 Claims, 10 Drawing Sheets

Figure 2:
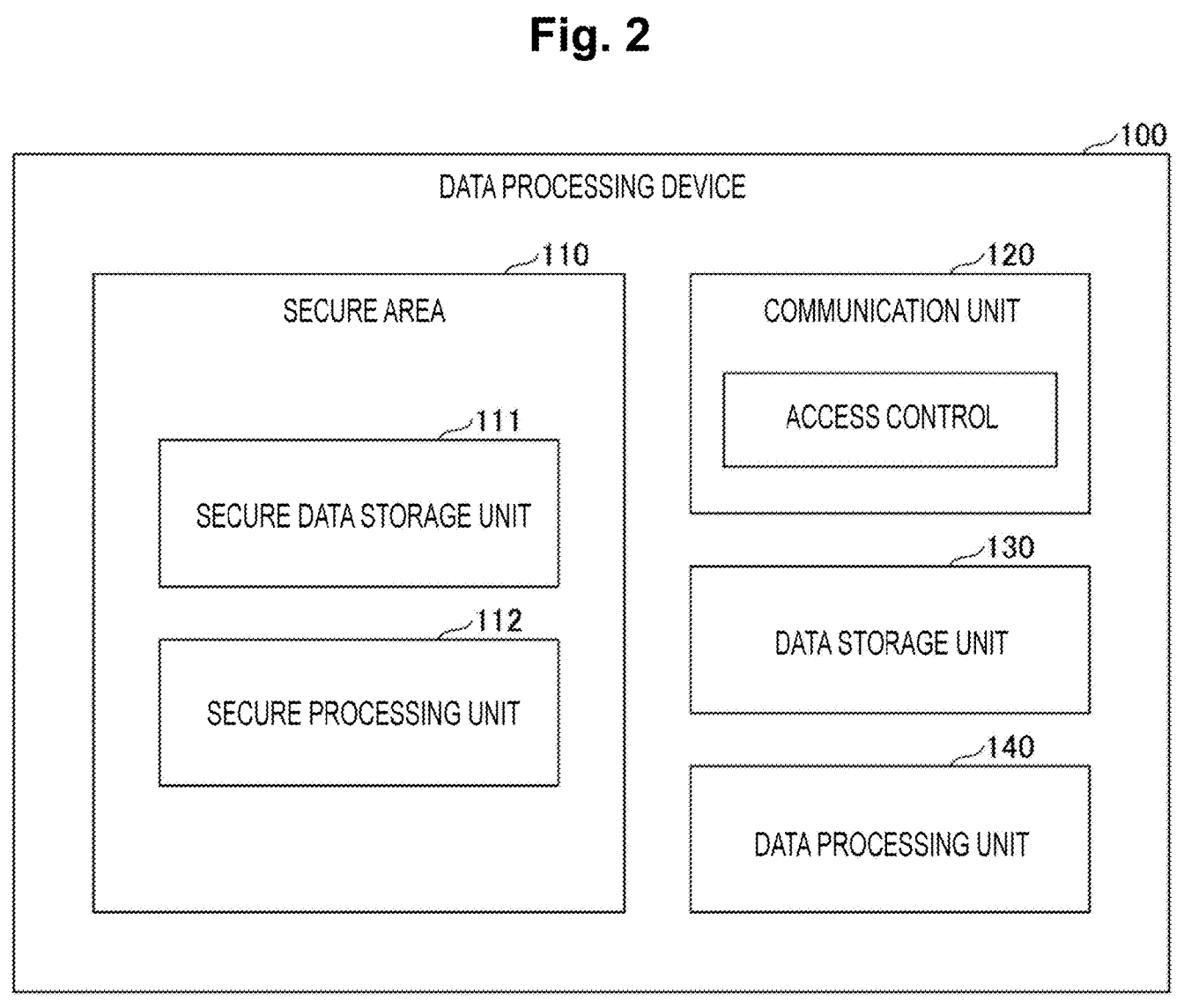

DATA PROCESSING DEVICE 100

SECURE AREA 110

SECURE DATA STORAGE UNIT 111

SECURE PROCESSING UNIT 112

COMMUNICATION UNIT 120

ACCESS CONTROL

DATA STORAGE UNIT 130

DATA PROCESSING UNIT 140

PROGRAM EXECUTION SYSTEM, DATA PROCESSING APPARATUS, PROGRAM EXECUTION METHOD, AND PROGRAM

TECHNICAL FIELD

The present invention relates to a concealment processing technology in an information and communication field.

BACKGROUND ART

As conventional technologies that perform calculation while concealing data and programs from cloud business operators, for example, there are confidential computing (Non-Patent Literature 1), a confidential VM (Non Patent Literature 2), and the like. By these technologies, for example, it is possible to isolate and keep highly confidential data secret while the data is processed in a cloud.

However, in these conventional technologies, in a case where different users hold different data and programs, the risk of such data and programs being leaked to each other is not considered. In addition, there is no concept of performing an access control according to a role, and there is also a problem that a file uploaded to a cloud according to the role, to which a user belongs, cannot be shared among users.

CITATION LIST

Non-Patent Literature

Non-Patent Literature 1: Microsoft Azure Confidential Computing, official website, https://docs.microsoft.com/ja-jp/azure/confidential-computing/overview Non-Patent Literature 2: Google Confidential VM, official website, https://cloud.google.com/compute/confidential-vm/docs?hl=ja

SUMMARY OF THE INVENTION

Technical Problem

The present invention has been made in view of the above aspects, and an object of the present invention is to provide a technology for preventing data leakage to a program provider and program leakage to a data holder and for implementing an access control according to a role, in a case where data held by the data holder is processed by a program provided by the program provider through a data processing device including a secure computing mechanism.

Solution to Problem

According to the disclosed technology, there is provided a program execution system including: a data holding device; a program providing device; and a data processing device including a mechanism that performs secret calculation in a secure area, in which:

the program providing device transmits an encrypted program obtained by encrypting a program P with a public key PKr1 corresponding to a first role to the data processing device;

the data holding device transmits encrypted data obtained by encrypting data D with a public key PKr2 corresponding to a second role to the data processing device;

the data processing device confirms whether or not the program providing device belongs to the first role, and generates a re-encrypted program obtained by re-encrypting the encrypted program with a public key PKp1 of the program providing device in a case where it is confirmed that the program providing device belongs to the first role;

the program providing device transmits a secret key SKp1 encrypted with a shared key Kp1 shared with the data processing device to the data processing device;

the data processing device confirms whether or not the data holding device belongs to the second role, and generates re-encrypted data obtained by re-encrypting the encrypted data with a public key PKd2 of the data holding device in a case where it is confirmed that the data holding device belongs to the second role;

the data holding device transmits a secret key SKd2 encrypted with a shared key Kd2 shared with the data processing device to the data processing device; and the data processing device calculates a result P(D) of executing the program P obtained by decrypting the re-encrypted program with the secret key SKp1 on the data D obtained by decrypting the re-encrypted data with the secret key SKd2, in the secure area.

Advantageous Effects of the Invention

According to the disclosed technology, there is provided a technology for preventing data leakage to a program provider and program leakage to a data holder, and for implementing an access control according to a role, in a case where data held by the data holder is processed by a program provided by the program provider through a data processing device including a secure computing mechanism.

BRIEF DESCRIPTION OF DRAWINGS

FIG. 1 is a diagram illustrating a system configuration example in an embodiment of the present invention.

FIG. 2 is a diagram illustrating a functional configuration example of a data processing device.

DESCRIPTION OF EMBODIMENTS

Figure 3:
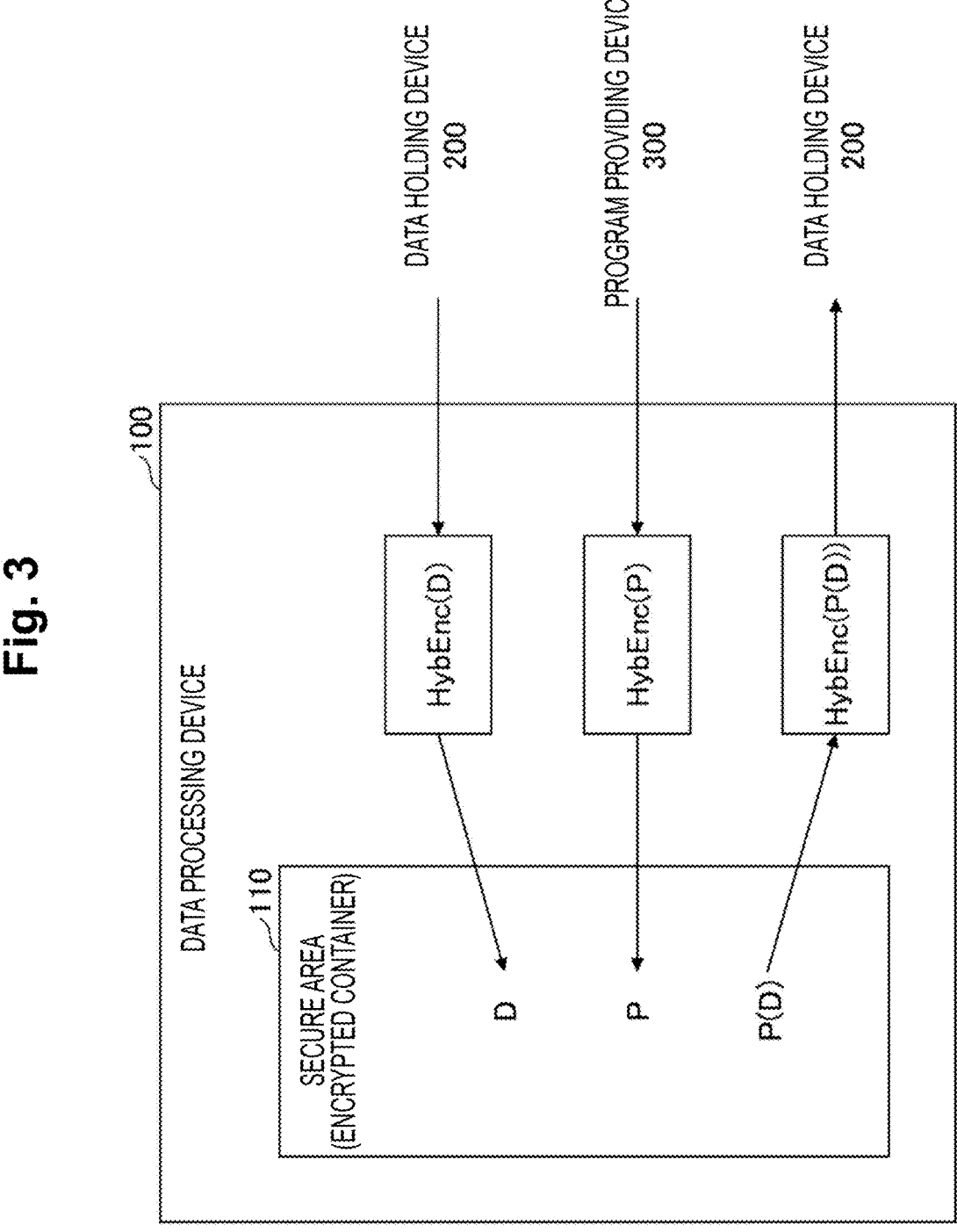
FIG. 3 is a diagram illustrating a state in which processing is performed in a secure area.

An embodiment of the present invention (present embodiment) will be described below with reference to the drawings. The embodiment to be described below is merely an example, and embodiments to which the present invention is applied are not limited to the following embodiment. Note that, in the description below, a program is denoted by P, data to be processed according to P is denoted by D, and a result of processing of D that is obtained according to P is denoted by P(D).

(System Configuration)

Figure 1:
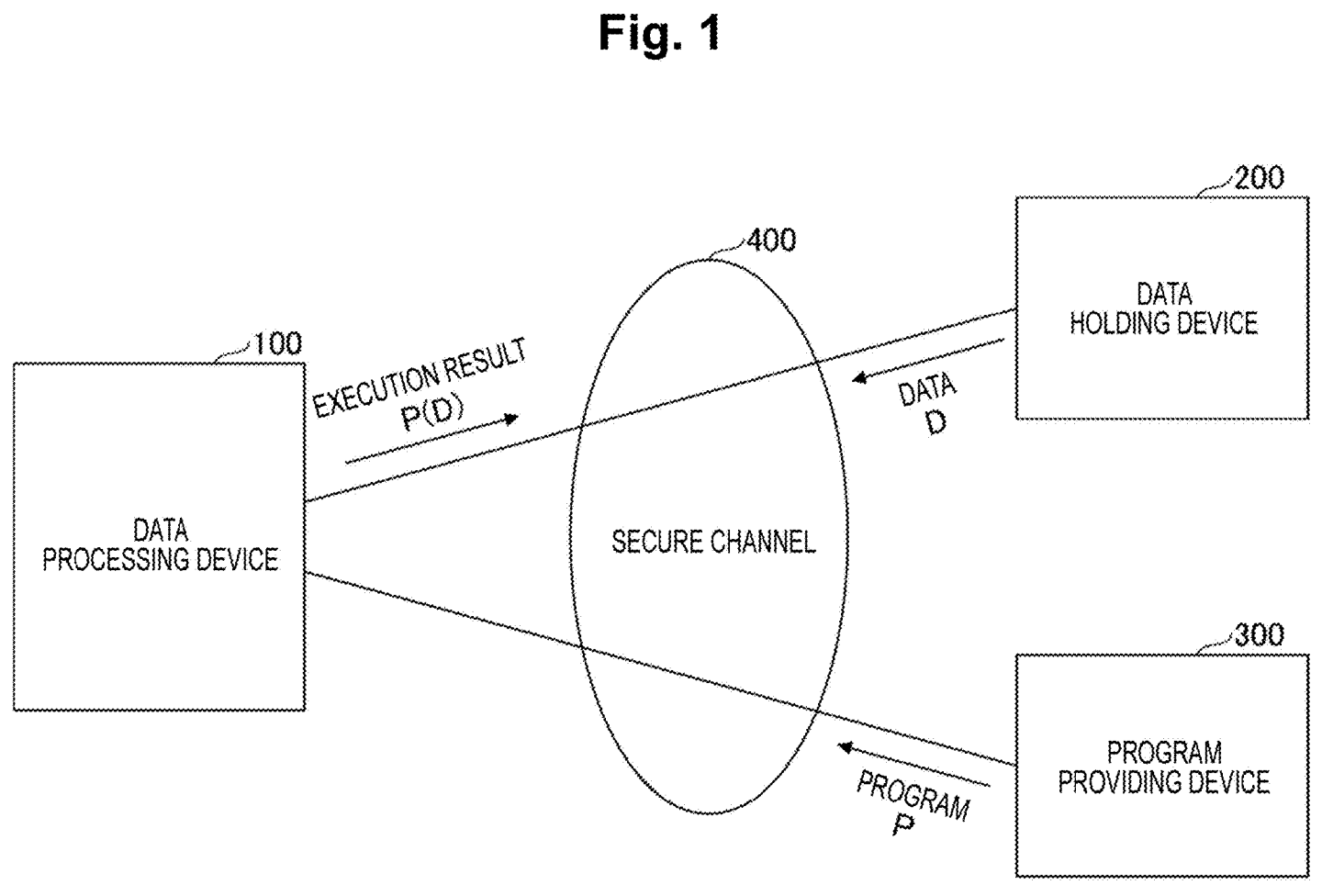

FIG. 1 illustrates a configuration example of a program execution system in the embodiment of the present invention. As illustrated in FIG. 1, the program execution system in the present embodiment includes a data processing device 100, a data holding device 200, and a program providing device 300.

Each of the data processing device 100, the data holding device 200, and the program providing device 300 may be a physical machine (a computer), or may be a virtual machine on a cloud. Alternatively, each of the data holding device 200 and the program providing device 300 may be a function (for example, a web browser) that operates on a physical machine or a virtual machine. Further, the data processing device 100 may be a system including a plurality of physical machines (in particular, in Example 1 to 3 described below, different containers may be respectively generated on different physical machines).

In the present embodiment, the data processing device 100 includes a secret computing mechanism or a secure computing mechanism by an application of a function that executes data processing in isolation from an existing OS and is called a trusted execution environment (TEE) function. In the present embodiment, for example, SEV of AMD (registered trademark) is assumed as the TEE function, but this is merely an example. The present invention can be applied to any TEE function. For example, the present invention can also be applied to SGX and TDX of Intel (registered trademark), TrustZone (registered trademark) and ARM Confidential Compute Architecture of Arm (registered trademark), and the like.

As illustrated in FIG. 1, a secure channel 400 is constructed between the data processing device 100 and the data holding device 200 and between the data processing device 100 and the program providing device 300, and data and programs can be safely transmitted and received. For example, this secure channel is constructed by a remote authentication protocol called Remote Attestation in SEV. Here, this is merely an example, and the secure channel may be constructed by any means.

In the present embodiment, the program P is transmitted from the program providing device 300 to the data processing device 100, the data D is transmitted from the data holding device 200 to the data processing device 100, and the data processing device 100 processes the data D according to the program P and provides the execution result P(D) to the data holding device 200.

With the secret computing mechanism, the data processing device 100 does not leak the program P and the data D to the outside of a secure area (for example, to a cloud on which the data processing device 100 operates). In addition to this, the present embodiment implements a mechanism with which the program P is not leaked to the data holding device 200 and the data D is not leaked to the program providing device 300. Furthermore, in addition to this, the present embodiment also implements the access control according to a role, by performing encryption in units of roles when transmitting (uploading) the program P and the data D to the data processing device 100, and by performing re-encryption (more particularly, TEE-based proxy re-encryption) in units of users (data holders, program authors) when processing the data D according to the program P. Here, the role is a term used in a role-based access control, and refers to, for example, information such as an authority label. Examples of the role include a team administrator, a channel administrator, a channel participant, and the like. In addition, the data holder is a holder of the data D, and is a user, an administrator, or the like of the data holding device 200. On the other hand, the program author is a provider of the program P, and is a user, an administrator, or the like of the program providing device 300. On the other hand, an administrator, an owner, or the like of the data processing device 10 will be referred to as a platform business operator (hereinafter referred to as a PF business operator).

As a result, in the program execution system of the present embodiment, in a use case where the secret computing mechanism is applied to data distribution, the data holder (the data holding device 200) having the highly confidential data D and the program author (the program providing device 300) having the highly confidential program P can execute the data/program in combination while mutually keeping the data/program secret. Furthermore, in addition to this, the access control is also performed according to a role to which each user (data holder, program author) belongs, and thus it is possible to implement the access control, for example, permitting (or not permitting) processing according to the program P according to the role; to which the program author belongs; and the role; to which the data holder belongs; and the like.

(Configuration Example of Data Processing Device)

FIG. 2 illustrates a functional configuration example of the data processing device 100. As illustrated in FIG. 2, the data processing device 100 includes a secure area 110 that is a protected area in which confidentiality is maintained, a communication unit 120 that performs data communication with another device (for example, the data holding device 200, the program providing device 300, or the like), a data storage unit 130 that stores data in a storage or the like outside the secure area 110, and a data processing unit 140 that performs various types of data processing outside the secure area 110.

The content of data and programs in the secure area 110 cannot be known from the outside. In the outside of the secure area 110, normal data storage and data processing (program execution) can be respectively performed by the data storage unit 130 and the data processing unit 140. It is also possible to perform data communication and access control in the data communication, by the communication unit 120.

In the secure area 110, data storage and data processing (program execution) are possible while confidentiality is maintained. FIG. 2 illustrates a secure data storage unit 111 and a secure processing unit 112 as functional units that perform these in the secure area 110. The secure data storage unit 111 stores various data in a storage area while maintaining confidentiality in the secure area 110. In addition, the secure processing unit 112 performs data processing (for example, activation and execution of P, generation (calculation) of a shared key (common key), encryption, decryption, signature verification, re-encryption, access control according to a role, and the like) in the secure area 110.

The secure area 110 itself can be implemented by an existing technology. Any technology may be used as an existing technology for implementing the secure area 110. For example, the secure area 110 may be implemented as a separate chip independent of a main CPU and a main memory in terms of hardware, or the secure area 110 may be implemented in terms of software by utilizing an encryption technology and an authentication technology. As a technology for implementing the secure area 110 in terms of software, for example, there is SEV described above, and it is assumed that SEV is used as an example in the present embodiment. In this case, the secure area 110 is generated as an encrypted container (Alternatively, it may be a virtual machine (VM).) in the data processing device 100. Note that, for example, in a case where a plurality of encrypted containers is generated, a plurality of the secure areas 110 exists.

FIG. 3 illustrates an image of data processing in the secure area 110. Note that, in the present embodiment, "HybEnc" means encryption by a public-key-based encryption method, and "Enc" means encryption by a shared-key-based encryption method. For example, HybEnc(D) is data encrypted by a public-key-based encryption method.

As illustrated in FIG. 3, the data processing device 100 receives HybEnc(D) from the data holding device 200, and receives HybEnc(P) from the program providing device 300.

In the secure area 110, HybEnc(D) and HybEnc(P) are decrypted, and D and P are obtained. Further, in the secure area 110, P(D) is calculated, and HybEnc(P(D)) is further calculated. HybEnc(P(D)) is transmitted to the data holding device 200.

As a result, it is possible to provide P(D) to the data holder without leakage of the program P and the data D to the PF business operator (the data processing device 100), without leakage of the data held by the data holder (the data holding device 200) to the program author (the program providing device 300), and without leakage of the program P provided by the program author to the data holder (the data holding device 200). Hereinafter, this is also referred to as a "concealment program execution".

In addition, at this time, in Example 1 to be described later, when the program P and the data D are transmitted (uploaded) to the data processing device 100, encryption is performed in units of roles, and when P(D) is calculated and provided, re-encryption (TEE-based proxy re-encryption) is performed in units of users according to a list of public keys of users included in a role for which the calculation and provision are permitted. As a result, access control according to a role is implemented, and both the access control and the concealment program execution are implemented.

In addition, in Example 2 to be described later, Example 1 is improved, and asymmetry between the program author and the data holder in access control is resolved. Further, in Example 3 to be described later, a part of Example 2 is modified, and the PF business operator (data processing device 100) also manages a part of the concealment program execution.

As described above, by a combination of calculation in the secure area 110 and encrypted communication, a mechanism (concealment program execution) is implemented in which the program P is not leaked to the data holding device 200 and the data D is not leaked to the program providing device 300 in addition to the fact that the program P and the data D are not leaked to the data processing device 100.

In the description below, Examples 1 to 3 will be described as examples of processing flows in the present embodiment. In each of examples to be described below, it is assumed that a mechanism of Remote Attestation is used in generating (sharing) a shared key. More specifically, a protocol is used in which a mechanism for mutual authentication between a user (the data holding device 200 and the program providing device 300) and a container is inserted into an elliptic curve Diffie-Hellman key exchange protocol (ECDHKE). In the present embodiment, this is referred to as ECDHE with mutual authentication.

In the authentication of the container, a third-party verification organization (for example, AMD verification service) intervenes; however, processing itself of generating a shared key with the third-party verification organization's intervention is an existing technology as Remote Attestation, and thus, in the description of Examples 1 to 3, only an outline is described of the processing related to Remote Attestation, and parts related to the present invention are described in detail.

In the following description, APP is an application program that operates on the container, and is published as OSS. The program P is executed on the APP.

In addition, PKp1 and SKp1 are respectively a public key and a secret key of the program providing device 300. PKd2 and SKd2 are respectively a public key and a secret key of the data holding device 200. In addition, HybEnc(A, B) means information obtained by encrypting A with B (public key), and Enc(A, B) means information obtained by encrypting A with B (shared key). H(A) means a hash value of A. Sig(A, B) means a signature for A by B (secret key). MAC(A, B) means a message authentication code for A using B (shared key).

In addition, it is assumed that VMr1 and VMr2 are containers (encrypted containers) for role administrators of a role r1 and a role r2, respectively, and have been activated in advance before processing to be described below. Further, PKr1 and SKr1 are a public key and a secret key of the role administrator of the role r1, respectively. PKr2 and SKr2 are a public key and a secret key of the role administrator of the role r2, respectively.

Note that it is assumed that each public key has been distributed in advance to an entity that requires the key.

In addition, in the following description, it is assumed that there is no replacement of the program operating on the container after activation of the container. As a result, for example, it is guaranteed that there is no illegality, such as returning of an execution result of a program B while presenting an execution evidence of a program A.

Example 1

Figure 4:
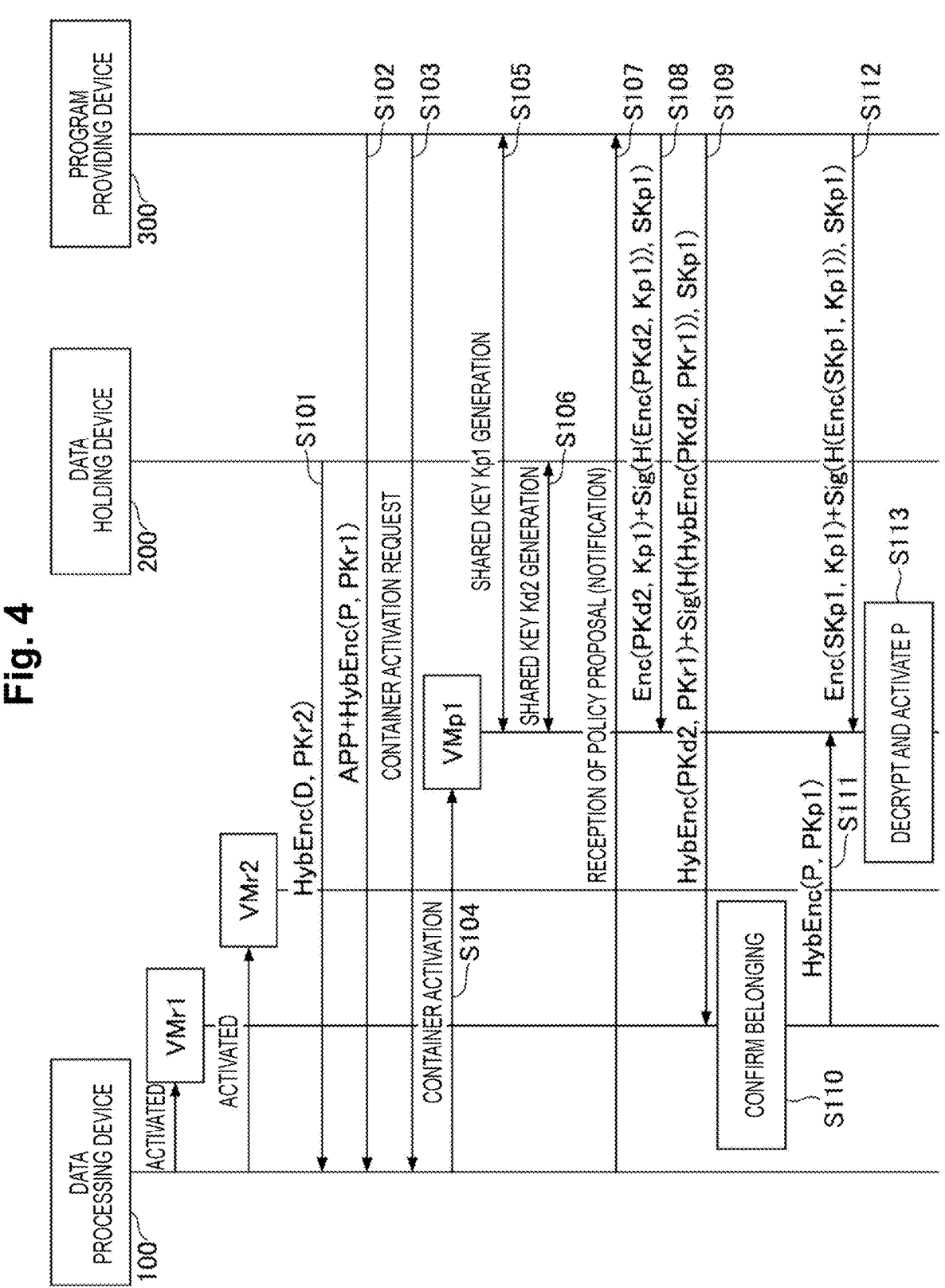
FIG. 4 is a sequence diagram (1/2) of processing in Example 1.
Figure 5:
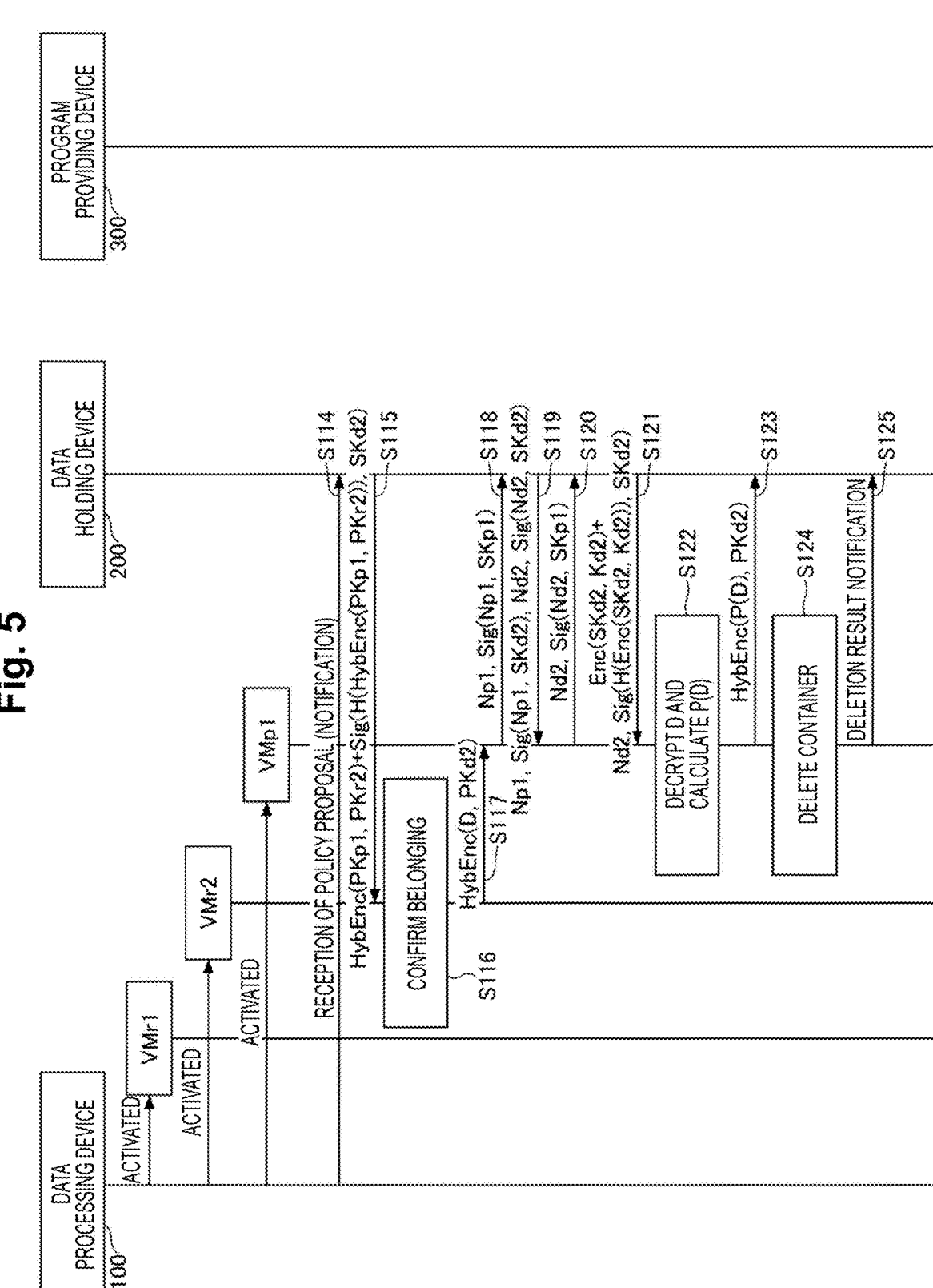
FIG. 5 is a sequence diagram (2/2) of the processing in Example 1.

First, Example 1 will be described with reference to FIGS. 4 and 5. As a premise of a processing flow in FIGS. 4 and 5, it is assumed that the data holding device 200 holds D, PKd2, SKd2, and PKr2, and the program providing device 300 holds APP, P, PKp1, SKp1, and PKr1. In addition, it is assumed that the program author belongs to the role r1 and the data holder belongs to the role r2.

In S101, the data holding device 200 transmits HybEnc (D, PKr2) to the data processing device 100. HybEnc(D, PKr2) is stored in a public storage area such as a storage of the data processing device 100 by the data storage unit 130.

In S102, the program providing device 300 transmits APP and HybEnc(P, PKr1) to the data processing device 100. These APP and HybEnc(P, PKr1) are stored in a public storage area such as a storage of the data processing device 100 by the data storage unit 130. Note that APP and HybEnc(P, PKr1) are also registered in the third-party verification organization by the program providing device 300, and is published.

In S103, the program providing device 300 transmits, to the data processing device 100, a container activation request for operation of APP.

In S104, the data processing device 100 generates and activates a container for operation of APP, and encrypts the container. As a result, an encrypted container (secure area 110) is generated on which APP operates. Hereinafter, an owner of the container generated here is assumed to be the program author (program providing device 300) and is represented as "VMp1".

In S105, VMp1 of the data processing device 100 and the program providing device 300 each generate (calculate) a shared key Kp1 by ECDHE with mutual authentication. At this time, VMp1 of the data processing device 100 authenticates the user (program providing device 300) by verifying a signature by SKp1 by using PKp1, and the program providing device 300 authenticates VMp1 by verifying a hash value H(APP+HybEnc(P, PKr1)) from VMp1 of the data processing device 100 via the third-party verification organization. Note that H(APP+HybEnc(P, PKr1)) represents a hash value of data obtained by combining APP and HybEnc(P, PKr1), and is, for example, a hash value of data obtained by connecting bit strings of APP and HybEnc(P, PKr1).

In S106, VMp1 of the data processing device 100 and the data holding device 200 each generate (calculate) a shared key Kd2 by ECDHE with mutual authentication. At this time, VMp1 of the data processing device 100 authenticates the user (data holding device 200) by verifying a signature by SKd2 by using PKd2, and the data holding device 200 authenticates VMp1 by verifying a hash value H(APP+HybEnc(P, PKp1)) from VMp1 of the data processing device 100 via the third-party verification organization.

In S107, the data processing device 100 notifies the program providing device 300 that a policy proposal from a policy proposer has been received. Note that the policy proposer is not limited to a specific person, and may be any person, and for example, the policy proposer may be the PF business operator itself, may be the data holder, may be the program author, or may be a third party other than the above. Here, the policy proposal is proposed in a format, for example, {name, role, request authority}, or the like. "Name" is a name of a public key registered in advance, and here, it is assumed that a name of the public key PKd2 is designated. In addition, "role" is a role to which a user having the public key belongs, and here, it is assumed that the role r1 corresponding to PKp1 is designated. "Request authority" is an authority to request setting from a user having the public key, and here, it is assumed that an authority necessary for concealment program execution is designated. In this case, the data processing device 100 is only required to transmit, to the program providing device 300, {name, role, request authority} or an encrypted version thereof to which a signature is added.

Note that, in the above description, the policy proposal is received by the PF business operator, but the present invention is not limited thereto, and for example, there may be a container (or VM) owned by the policy proposer, and VMp1 may receive the policy proposal by inter-container communication. In this case, VMp1 may transmit Enc({name, role, request authority}, Kp1) to the program providing device 300 to perform notification of reception of the policy proposal, or VMp1 may transmit Enc({name, role, request authority}, Kp1) to VMr1 by inter-container communication, and then VMr1 may transmit Enc ({name, role, request authority}, Kp1) and Sig(Enc({name, role, request authority}, Kp1), SKr1) to the program providing device 300 to perform notification of reception of the policy proposal.

The program providing device 300 that has received the notification of reception of the policy proposal displays, for example, a screen including a display component such as a button for selecting whether or not to permit the request authority to the user corresponding to the public key PKd2, for the user corresponding to PKp1. Then, in a case where the button representing "permit" is pressed on the screen, the program providing device 300 adds the public key PKd2 to its own permitted public key list. As a result, in the program providing device 300, PKp1 is managed as an authorization entity, and PKd2 is managed as an authorization target.

Here, the permitted public key list is a list of public keys permitted for the policy proposal.

In S108, the program providing device 300 transmits Enc(PKd2, Kp1) and Sig(H(Enc(PKd2, Kp1)), SKp1) to VMp1 of the data processing device 100. VMp1 of the data processing device 100 that has received Enc(PKd2, Kp1) and Sig(H(Enc(PKd2, Kp1)), SKp1) verifies Sig(H(Enc (PKd2, Kp1)), SKp1), and in a case where the verification is successful, manages PKp1 as a permission entity and PKd2 as a permission target. Note that this is implemented by adding the public key PKd2 to an authorized public key list having PKp1 as an authorization entity.

In S109, the program providing device 300 transmits HybEnc(PKd2, PKr1) and Sig(H(HybEnc(PKd2, PKr1)), SKp1) to VMr1 of the data processing device 100. VMr1 of the data processing device 100 that has received HybEnc (PKd2, PKr1) and Sig(H(HybEnc(PKd2, PKr1)), SKp1) verifies Sig(H(HybEnc(PKd2, PKr1)), SKp1), and in a case where the verification is successful, manages PKp1 as a permission entity and PKd2 as a permission target. Note that this is implemented by adding the public key PKd2 to an authorized public key list having PKp1 as an authorization entity.

In S110, VMr1 of the data processing device 100 confirms whether or not the program author (program providing device 300) belongs to the role r1. Then, in a case where it can be confirmed that the program author belongs to the role r1, VMr1 of the data processing device 100 extracts HybEnc (P, PKr1) from the public storage area, performs decryption with SKr1, and performs encryption with PKp1 to generate HybEnc(P, PKp1). This means that VMr1 of the data processing device 100 decrypts HybEnc(P, PKr1) as proxy for the program author and performs re-encryption with the public key PKp1 of the program author. Note that since HybEnc(P, PKr1) is decrypted and re-encrypted in the role administrator container VMr1, there is no risk of leakage of the program P.

Note that, in a case where it cannot be confirmed that the program author belongs to the role r1, proxy decryption and re-encryption of HybEnc(P, PKr1) are not performed.

In S111, VMr1 of the data processing device 100 transmits HybEnc(P, PKp1) to VMp1 by inter-container communication.

In S112, the program providing device 300 transmits Enc(SKp1, Kp1) and Sig(H(Enc(SKp1, Kp1)), SKp1) to VMp1 of the data processing device 100. VMp1 of the data processing device 100 that has received Enc(SKp1, Kp1) and Sig(H(Enc(SKp1, Kp1)), SKp1) verifies Sig(H(Enc (SKp1, Kp1)), SKp1), and in a case where the verification is successful, decrypts Enc(SKp1, Kp1) with Kp1 and extracts SKp1. As a result, the secret key SKp1 of the program providing device 300 is deposited in VMp1. Note that SKp1 is stored in a secure storage area by the secure data storage unit 111.

In S113, VMp1 of the data processing device 100 decrypts HybEnc(P, PKp1) with SKp1, extracts P, and activates P on VMp1. In addition, P is activated by the secure processing unit 112.

In S114, the data processing device 100 notifies the data holding device 200 that the policy proposal is received from the policy proposer. Here, the policy proposal is proposed in a format, for example, {name, role, request authority}, or the like; however, here, it is assumed that a name of the public key PKp1 is designated for "name", the role r2 corresponding to PKd2 is designated for "role", and the authority necessary for concealment program execution is designated for "request authority". In this case, the data processing device 100 is only required to transmit, to the data holding device 200, {name, role, request authority} or an encrypted version thereof to which a signature is added.

Note that, in the above description, the policy proposal is received by the PF business operator, but the present invention is not limited thereto, and for example, there may be a container (or VM) owned by the policy proposer, and VMp1 may receive the policy proposal by inter-container communication. In this case, VMp1 may transmit Enc({name, role, request authority}, Kd2) to the data holding device 200 to perform notification of reception of the policy proposal, or VMp1 may transmit Enc({name, role, request authority}, Kd2) to VMr2 by inter-container communication, and then VMr2 may transmit Enc ({name, role, request authority}, Kd2) and Sig(Enc({name, role, request authority}, Kd2), SKr2) to the data holding device 200 to perform notification of reception of the policy proposal.

The data holding device 200 that has received the notification of reception of the policy proposal displays, for example, a screen including a display component such as a button for selecting whether or not to permit the request authority to the user corresponding to the public key PKp1, for the user corresponding to PKd2. Then, in a case where the button representing "permit" is pressed on the screen, the data holding device 200 adds the public key PKp1 to its own permitted public key list. As a result, in the data holding device 200, PKd2 is managed as an authorization entity, and PKp1 is managed as an authorization target.

In S115, the data holding device 200 transmits HybEnc (PKp1, PKr2) and Sig(H(HybEnc(PKp1, PKr2)), SKd2) to VMr2 of the data processing device 100. VMr2 of the data processing device 100 that has received HybEnc(PKp1, PKr2) and Sig(H(HybEnc(PKp1, PKr2)), SKd2) verifies Sig(H(HybEnc(PKp1, PKr2)), SKd2), and in a case where the verification is successful, manages PKd2 as a permission entity and PKp1 as a permission target. Note that this is implemented by adding the public key PKp1 to an authorized public key list having PKd2 as an authorization entity.

In S116, VMr2 of the data processing device 100 confirms whether or not the data holder (data holding device 200) belongs to the role r2. Then, in a case where it can be confirmed that the data holder belongs to the role r2, VMr2 of the data processing device 100 extracts HybEnc(D, PKr2) from the public storage area, performs decryption with SKr2, and performs encryption with PKd2 to generate HybEnc(D, PKd2). This means that VMr2 of the data processing device 100 decrypts HybEnc(D, PKr2) as proxy for the data holder and performs re-encryption with the public key PKd2 of the data holder. Note that since HybEnc (D, PKr2) is decrypted and encrypted in the role administrator container VMr2, there is no risk of leakage of the data D.

Note that, in a case where it cannot be confirmed that the data holder belongs to the role r2, proxy decryption and re-encryption of HybEnc(D, PKr2) are not performed.

In S117, VMr2 of the data processing device 100 transmits HybEnc(D, PKd2) to VMp1 by inter-container communication.

In S118, VMp1 of the data processing device 100 transmits Np1 and Sig(Np1, SKp1) to the data holding device 200. Note that this means that VMp1 performs signature as proxy (TEE proxy signature) for the program author. Here, Np1 is a nonce value. The data holding device 200 that has received Np1 and Sig(Np1, SKp1) verifies Sig(Np1, SKp1) (performs verification including matching of Np1), and generates Sig(Np1, SKd2) in a case where the verification is successful.

In S119, the data holding device 200 transmits Np1, Sig(Np1, SKd2), Nd2, and Sig(Nd2, SKd2) to VMp1 of the data processing device 100. Here, Nd2 is a nonce value. VMp1 of the data processing device 100 that has received Np1, Sig(Np1, SKd2), Nd2, and Sig(Nd2, SKd2) verifies Sig(Np1, SKd2) and Sig(Nd2, SKd2) (performs verification including matching of Np1 and matching of Nd2), and generates Sig(Nd2, SKp1) in a case where the verification is successful. Note that this means that VMp1 performs signature as proxy (TEE proxy signature) for the program author.

In S120, VMp1 of the data processing device 100 transmits Nd2 and Sig(Nd2, SKp1) to the data holding device 200. The data holding device 200 that has received Nd2 and Sig(Nd2, SKp1) verifies Sig(Nd2, SKp1) (performs verification including matching of Nd2), and generates Enc (SKd2, Kd2) and Sig(H(Enc(SKd2, Kd2)), SKd2) in a case where the verification is successful.

In this manner, the nonce value is transmitted between VMp1 and the data holding device 200, and thus the replay attack is prevented.

In S121, the data holding device 200 transmits Enc(SKd2, Kd2) and Sig(H(Enc(SKd2, Kd2)), SKd2) to VMp1 of the data processing device 100. VMp1 of the data processing device 100 verifies Sig(H(Enc(SKd2, Kd2)), SKd2), and decrypts Enc(SKd2, Kd2) with Kd2 and extracts SKd2 in a case where the verification is successful. As a result, the secret key SKd2 of the data holding device 200 is deposited in VMp1. Note that SKd2 is stored in a secure storage area by the secure data storage unit 111.

In S122, VMp1 of the data processing device 100 decrypts HybEnc(D, PKd2) with SKd2, extracts D, and calculates P(D).

In S123, VMp1 of the data processing device 100 transmits HybEnc(P(D), PKd2) to the data holding device 200. As a result, the data holding device 200 can decrypt HybEnc (P(D), PKd2) with SKd2, and extract P(D).

In S124, the data processing device 100 deletes VMp1.

In S125, the data processing device 100 notifies the data holding device 200 that VMp1 has been deleted.

Note that, in the above processing flow, the communication unit 120 of the data processing device 100 may block communication other than communication by the secure area 110 related to P or D. In particular, download communication to devices other than the data holding device 200 may be blocked.

According to Example 1, a mechanism is implemented in which the program P is not leaked to the data holding device 200 and the data D is not leaked to the program providing device 300 in addition to the fact that the program P and the data D are not leaked to the data processing device 100, and access control according to a role is implemented.

Note that HybEnc(P, PKr1) is decrypted in VMr1 in S110 described above, and HybEnc(D, PKr2) is decrypted in VMr2 in S116 described above; however, since both VMr1 and VMr2 are role administrator containers, there is no risk of leakage of the program P and the data D. In addition, when the program P is transmitted to the encrypted container/VM (VMp1 in Example 1, and VMs1 in Examples 2 and 3 described later) in which P(D) is calculated, encryption is performed as HybEnc(P, PKp1), and similarly, when the data D is transmitted, encryption is performed as HybEnc(D, PKd2), and thus, there is no risk of leakage of the program P and the data D. Thereafter, P(D) is calculated after policy agreement is reached between the program author and the data holder; however, since encryption is performed as HybEnc(P(D), PKd2) when the calculation result is transmitted, there is no risk of leakage of the calculation result.

Example 2

In Example 1, since the owner of the container in which the program P is executed is the program author, a relationship between the program author and the data holder in the access control is asymmetrically stronger in the program author. Thus, in Example 2, the owner of the container in which the program P is executed is set to a person other than the program author, and thus the asymmetry is resolved.

Figure 6:
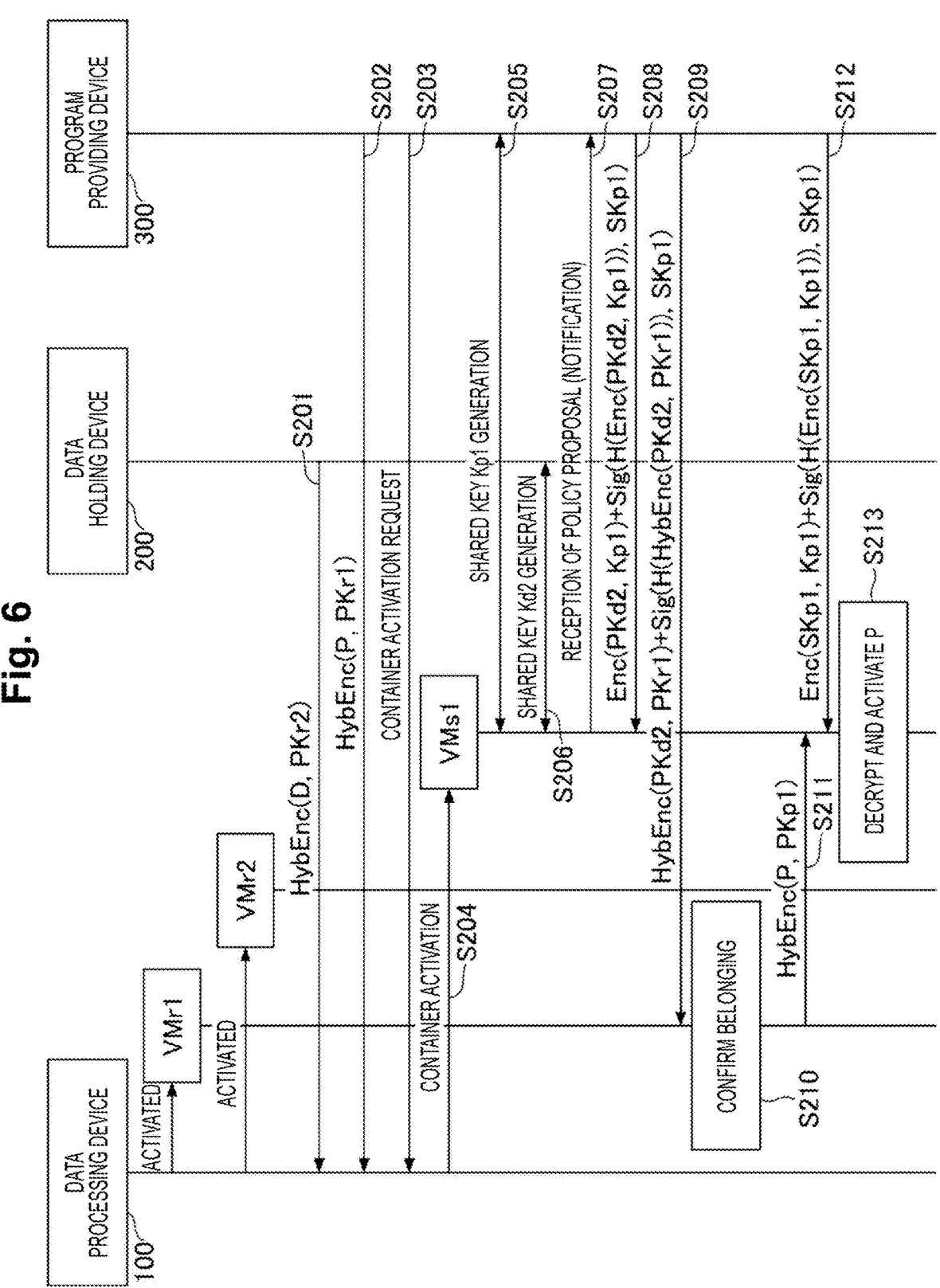
FIG. 6 is a sequence diagram (1/2) of processing in Example 2.
Figure 7:
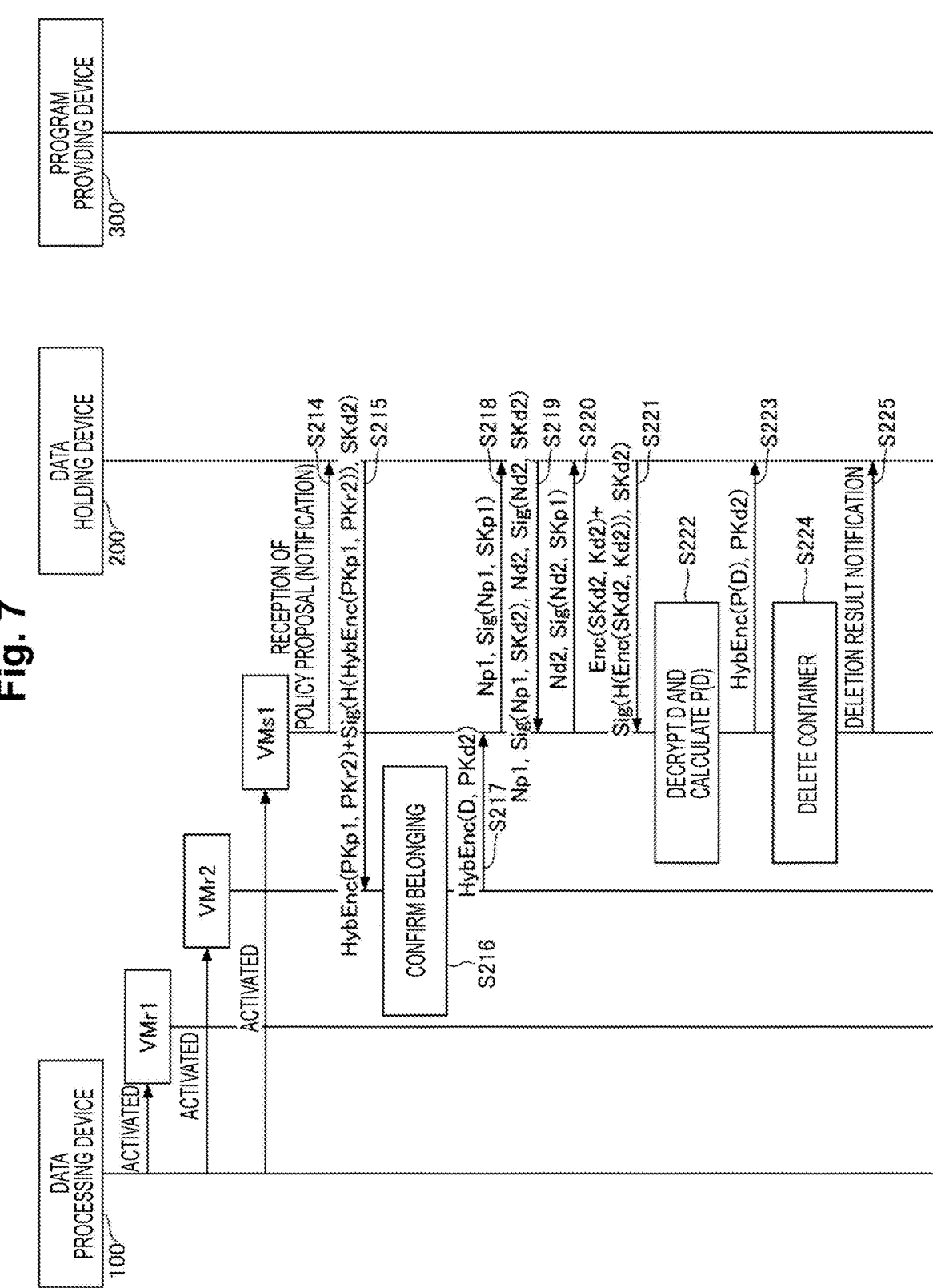
FIG. 7 is a sequence diagram (2/2) of the processing in Example 2.

Example 2 will be described with reference to FIGS. 6 and 7. Note that, in Example 2, differences from Example 1 will be mainly described, and the description of the same components as those of Example 1 will be omitted or simplified.

Since S201 to S203 are similar to S101 to S103 of Example 1, respectively, the description thereof will be omitted.

In S204, the data processing device 100 generates and activates a container for operation of APP, and encrypts the container. As a result, an encrypted container (secure area 110) is generated on which APP operates. Hereinafter, it is assumed that the owner of the container generated here is other than the program author, and is represented as "VMs1". An owner of VMs1 is only required to be a person other than the program author (and the data holder), and examples thereof include an administrator of concealment program execution, a policy proposer, and a PF business operator. Note that, it is assumed that the program author and the data holder trust the owner of VMs1.

Here, it is preferable that VMs1 is subjected to functional restriction as in a sandbox or the like. Such a VMs1 can be implemented by, for example, a Docker image subjected to functional restriction distributed by OSS. Hereinafter, it is assumed that VMs1 is implemented by the Docker image, and the Docker image is registered by its owner in the third-party verification organization and published.

In S205, VMs1 of the data processing device 100 and the program providing device 300 each generate (calculate) a shared key Kp1 by ECDHE with mutual authentication. At this time, VMs1 of the data processing device 100 authenticates the user (program providing device 300) by verifying a signature by SKp1 by using PKp1, and the program providing device 300 authenticates VMs1 by verifying a hash value H(Docker image that implements VMs1) from VMs1 of the data processing device 100 via the third-party verification organization.

In S206, VMs1 of the data processing device 100 and the data holding device 200 each generate (calculate) a shared key Kd2 by ECDHE with mutual authentication. At this time, VMs1 of the data processing device 100 authenticates the user (data holding device 200) by verifying a signature by SKd2 by using PKd2, and the data holding device 200 authenticates VMs1 by verifying a hash value H(Docker image that implements VMs1) from VMs1 of the data processing device 100 via the third-party verification organization.

In S207, VMs1 of the data processing device 100 notifies the program providing device 300 that a policy proposal from a policy proposer has been received. Note that the policy proposer is not limited to a specific person, and may be any person, and for example, the policy proposer may be the PF business operator, may be the data holder, may be the program author, or may be a third party other than the above.

Here, the policy proposal is proposed in a format, for example, {name, role, request authority}, or the like. Here, it is assumed that a name of the public key PKd2 is designated for "name", the role r1 corresponding to PKp1 is designated for "role", and the authority necessary for concealment program execution is designated for "request authority". In this case, VMs1 of the data processing device 100 is only required to transmit Enc({name, role, request authority}, Kp1) and MAC(Enc({name, role, request authority}, Kp1), Kp1) to the program providing device 300 to perform notification of reception of the policy proposal.

The program providing device 300 that has received the notification of reception of the policy proposal verifies MAC(Enc({name, role, request authority}, Kp1), Kp1), and in a case where the verification is successful, displays, for example, a screen including a display component such as a button for selecting whether or not to permit the request authority to the user corresponding to the public key PKd2, for the user corresponding to PKp1. Then, in a case where the button representing "permit" is pressed on the screen, the program providing device 300 adds the public key PKd2 to its own permitted public key list. As a result, in the program providing device 300, PKp1 is managed as an authorization entity, and PKd2 is managed as an authorization target.

In S208, the program providing device 300 transmits Enc(PKd2, Kp1) and Sig(H(Enc(PKd2, Kp1)), SKp1) to VMs1 of the data processing device 100. VMs1 of the data processing device 100 that has received Enc(PKd2, Kp1) and Sig(H(Enc(PKd2, Kp1)), SKp1) verifies Sig(H(Enc (PKd2, Kp1)), SKp1), and in a case where the verification is successful, manages PKp1 as a permission entity and PKd2 as a permission target.

Since S209 to S210 are similar to S109 to S110 of Example 1, respectively, the description thereof will be omitted.

In S211, VMr1 of the data processing device 100 transmits HybEnc(P, PKp1) to VMs1 by inter-container communication.

In S212, the program providing device 300 transmits Enc(SKp1, Kp1) and Sig(H(Enc(SKp1, Kp1)), SKp1) to VMs1 of the data processing device 100. VMs1 of the data processing device 100 that has received Enc(SKp1, Kp1) and Sig(H(Enc(SKp1, Kp1)), SKp1) verifies Sig(H(Enc (SKp1, Kp1)), SKp1), and in a case where the verification is successful, decrypts Enc(SKp1, Kp1) with Kp1 and extracts SKp1. As a result, the secret key SKp1 of the program providing device 300 is deposited in VMs1.

In S213, VMs1 of the data processing device 100 decrypts HybEnc(P, PKp1) with SKp1, extracts P, and activates P on VMs1.

In S214, VMs1 of the data processing device 100 notifies the data holding device 200 that the policy proposal is received from the policy proposer. Here, the policy proposal is proposed in a format, for example, {name, role, request authority}, or the like; however, here, it is assumed that a name of the public key PKp1 is designated for "name", the role r2 corresponding to PKd2 is designated for "role", and the authority necessary for concealment program execution is designated for "request authority". In this case, VMs1 of the data processing device 100 is only required to transmit Enc({name, role, request authority}, Kd2) and MAC(Enc ({name, role, request authority}, Kd2), Kd2) to the data holding device 200 to perform notification of reception of the policy proposal.

The data holding device 200 that has received the notification of reception of the policy proposal verifies MAC (Enc({name, role, request authority}, Kd2), Kd2), and in a case where the verification is successful, displays, for example, a screen including a display component such as a button for selecting whether or not to permit the request authority to the user corresponding to the public key PKp1, for the user corresponding to PKd2. Then, in a case where the button representing "permit" is pressed on the screen, the data holding device 200 adds the public key PKp1 to its own permitted public key list. As a result, in the data holding device 200, PKd2 is managed as an authorization entity, and PKp1 is managed as an authorization target.

Since S215 to S216 are similar to S115 to S116 of Example 1, respectively, the description thereof will be omitted.

In S217, VMr2 of the data processing device 100 transmits HybEnc(D, PKd2) to VMs1 by inter-container communication.

In S218, VMs1 of the data processing device 100 transmits Np1 and Sig(Np1, SKp1) to the data holding device 200. Note that this means that VMs1 performs signature as proxy (TEE proxy signature) for the program author. The data holding device 200 that has received Np1 and Sig(Np1, SKp1) verifies Sig(Np1, SKp1) (performs verification including matching of Np1), and generates Sig(Np1, SKd2) in a case where the verification is successful.

In S219, the data holding device 200 transmits Np1, Sig(Np1, SKd2), Nd2, and Sig(Nd2, SKd2) to VMs1 of the data processing device 100. VMs1 of the data processing device 100 that has received Np1, Sig(Np1, SKd2), Nd2, and Sig(Nd2, SKd2) verifies Sig(Np1, SKd2) and Sig(Nd2, SKd2) (performs verification including matching of Np1 and matching of Nd2), and generates Sig(Nd2, SKp1) in a case where the verification is successful. Note that this means that VMs1 performs signature as proxy (TEE proxy signature) for the program author.

In S220, VMs1 of the data processing device 100 transmits Nd2 and Sig(Nd2, SKp1) to the data holding device 200. The data holding device 200 that has received Nd2 and Sig(Nd2, SKp1) verifies Sig(Nd2, SKp1) (performs verification including matching of Nd2), and generates Enc(SKd2, Kd2) and Sig(H(Enc(SKd2, Kd2)), SKd2) in a case where the verification is successful.

In S221, the data holding device 200 transmits Enc(SKd2, Kd2) and Sig(H(Enc(SKd2, Kd2)), SKd2) to VMs1 of the data processing device 100. VMs1 of the data processing device 100 verifies Sig(H(Enc(SKd2, Kd2)), SKd2), and decrypts Enc(SKd2, Kd2) with Kd2 and extracts SKd2 in a case where the verification is successful. As a result, the secret key SKd2 of the data holding device 200 is deposited in VMs1.

In S222, VMs1 of the data processing device 100 decrypts HybEnc(D, PKd2) with SKd2, extracts D, and calculates P(D).

In S223, VMs1 of the data processing device 100 transmits HybEnc(P(D), PKd2) to the data holding device 200.

In S224, the data processing device 100 deletes VMs1.

In S225, the data processing device 100 notifies the data holding device 200 that VMs1 has been deleted.

Note that, in the above processing flow, the communication unit 120 of the data processing device 100 may block communication other than communication by the secure area 110 related to P or D. In particular, download communication to devices other than the data holding device 200 may be blocked.

According to Example 2, in Example 1, the owner of the container in which the program P is executed is a person other than the program author and the data holder, so that asymmetry of the relationship between the program author and the data holder can be resolved.

Example 3

In Example 3, it is assumed that, in Example 2, the notification of reception of the policy proposal is issued from the PF business operator and the PF operator does not attack the access control policy, and Enc and MAC are made unnecessary at the time of notification of reception of the policy proposal. In addition, on this premise, the PF business operator manages a part of concealment program execution.

Figure 8:
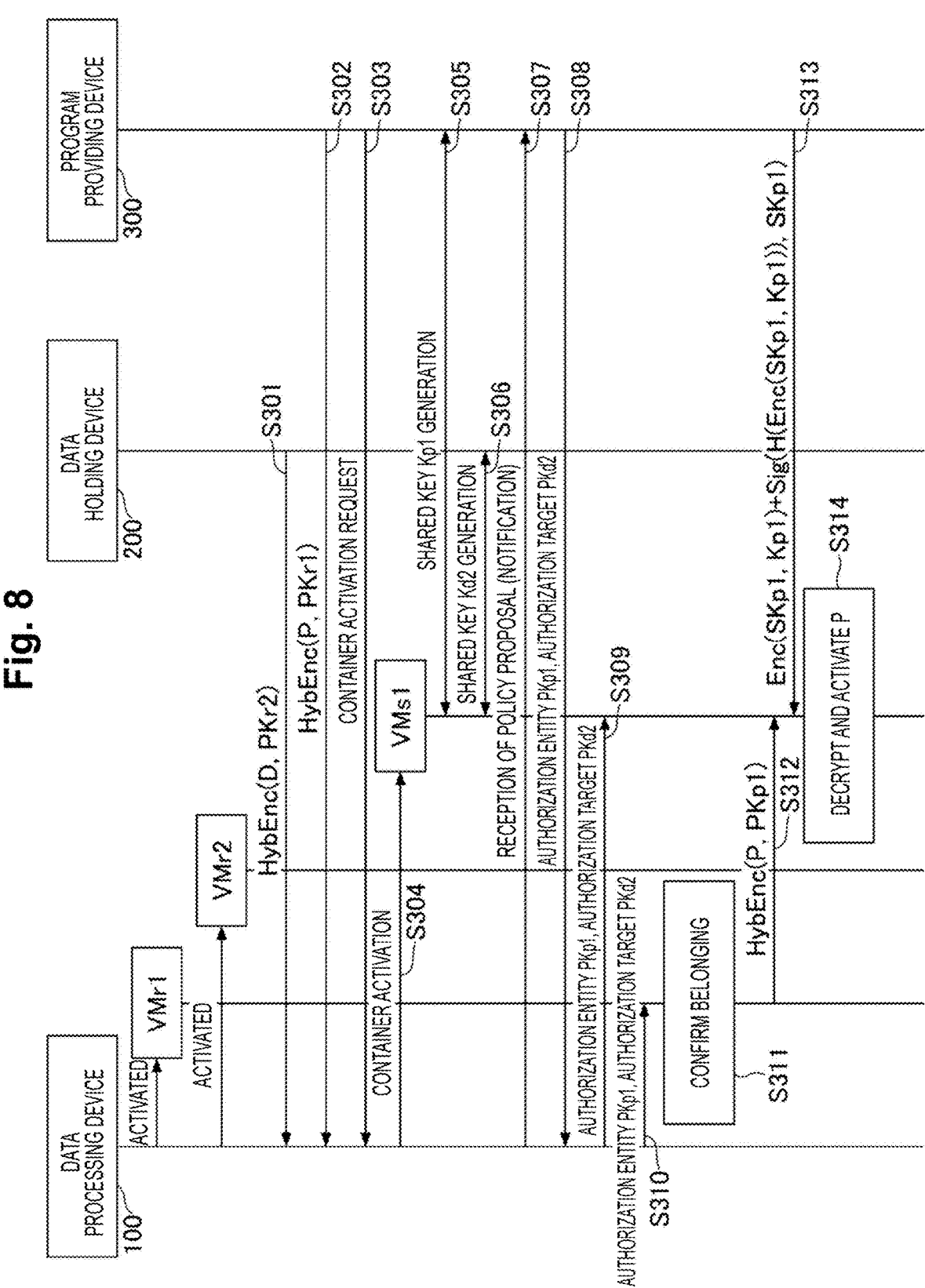
FIG. 8 is a sequence diagram (1/2) of processing in Example 3.
Figure 9:
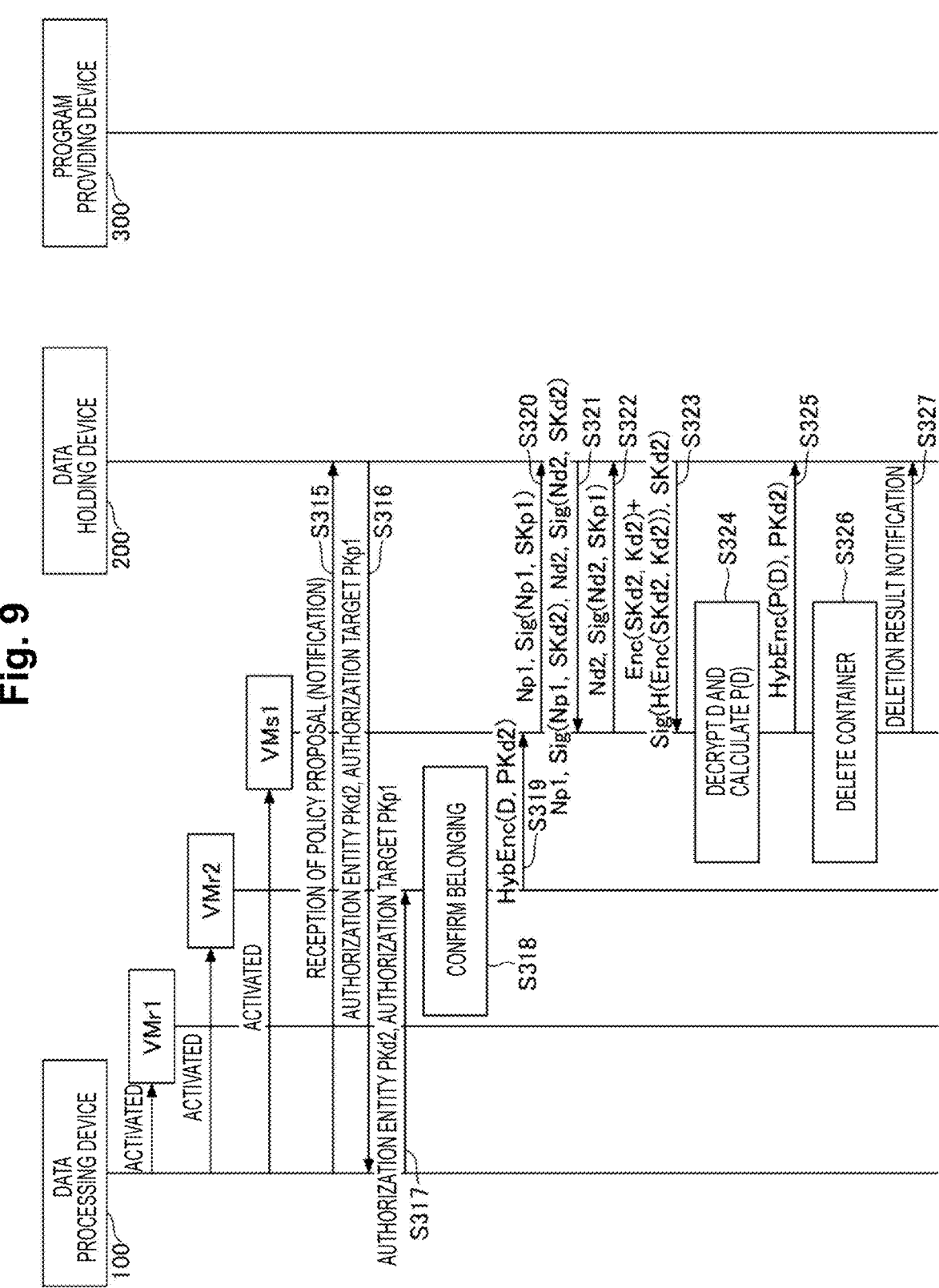
FIG. 9 is a sequence diagram (2/2) of the processing in Example 3.

Example 3 will be described with reference to FIGS. 8 and 9. Note that, in Example 3, differences from Example 2 will be mainly described, and the description of the same components as those of Example 2 will be omitted or simplified.

Since S301 to S306 are similar to S201 to S206 of Example 2, respectively, the description thereof will be omitted.

In S307, the data processing device 100 notifies the program providing device 300 that a policy proposal from a policy proposer has been received. Note that the policy proposer is not limited to a specific person, and may be any person, and for example, the policy proposer may be the PF business operator itself, may be the data holder, may be the program author, or may be a third party other than the above. Here, the policy proposal is proposed in a format, for example, {name, role, request authority}, or the like. Here, it is assumed that a name of the public key PKd2 is designated for "name", the role r1 corresponding to PKp1 is designated for "role", and the authority necessary for concealment program execution is designated for "request authority". In this case, the data processing device 100 is only required to transmit {name, role, request authority} to the program providing device 300 to perform notification of reception of the policy proposal.

The program providing device 300 that has received the notification of reception of the policy proposal displays, for example, a screen including a display component such as a button for selecting whether or not to permit the request authority to the user corresponding to the public key PKd2, for the user corresponding to PKp1. Then, in a case where the button representing "permit" is pressed on the screen, the program providing device 300 adds the public key PKd2 to its own permitted public key list. As a result, in the program providing device 300, PKp1 is managed as an authorization entity, and PKd2 is managed as an authorization target.

In S308, the program providing device 300 transmits the authorization entity PKp1 and the authorization target PKd2 to the data processing device 100.

In S309, the data processing device 100 transmits the authorization entity PKp1 and the authorization target PKd2 to VMs1. As a result, in VMs1 of the data processing device 100, PKp1 is managed as an authorization entity, and PKd2 is managed as an authorization target.

In S310, the data processing device 100 transmits the authorization entity PKp1 and the authorization target PKd2 to VMr1. As a result, in VMr1 of the data processing device 100, PKp1 is managed as an authorization entity, and PKd2 is managed as an authorization target.

Since S311 to S314 are similar to S210 to S213 of Example 2, respectively, the description thereof will be omitted.

In S315, the data processing device 100 notifies the data holding device 200 that the policy proposal is received from the policy proposer. Here, the policy proposal is proposed in a format, for example, {name, role, request authority}, or the like; however, here, it is assumed that a name of the public key PKp1 is designated for "name", the role r2 corresponding to PKd2 is designated for "role", and the authority necessary for concealment program execution is designated for "request authority". In this case, the data processing device 100 is only required to transmit {name, role, request authority} to the data holding device 200 to perform notification of reception of the policy proposal.

The data holding device 200 that has received the notification of reception of the policy proposal displays, for example, a screen including a display component such as a button for selecting whether or not to permit the request authority to the user corresponding to the public key PKp1, for the user corresponding to PKd2. Then, in a case where the button representing "permit" is pressed on the screen, the data holding device 200 adds the public key PKp1 to its own permitted public key list. As a result, in the program providing device 300, PKd2 is managed as an authorization entity, and PKp1 is managed as an authorization target.

In S316, the data holding device 200 transmits the authorization entity PKd2 and the authorization target PKp1 to the data processing device 100.

In S317, the data processing device 100 transmits the authorization entity PKd2 and the authorization target PKp1 to VMr2. As a result, in VMr1 of the data processing device 100, PKd2 is managed as an authorization entity, and PKp1 is managed as an authorization target.

Since S318 to S327 are similar to S216 to S225 of Example 2, respectively, the description thereof will be omitted.

Note that, in the above processing flow, the communication unit 120 of the data processing device 100 may block communication other than communication by the secure area 110 related to Por D. In particular, download communication to devices other than the data holding device 200 may be blocked.

According to Example 3, in Example 2, Enc and MAC can be made unnecessary at the time of notification of reception of the policy proposal.

Supplement to Examples 1 to 3

The program P may be, for example, an artificial intelligence (AI) program or the like including a deep neural network (DNN) or the like. In this case, by performing code sign on the AI using the secret key of each user, it is also possible to clearly indicate which user's authority the AI has.

The AI may be read as digital twin.
(Hardware Configuration Example)

It is possible to implement all of the data processing device 100, the data holding device 200, and the program providing device 300, by causing a computer to execute a program, for example. This computer may be a physical computer, or may be a virtual machine on a cloud. The data processing device 100, the data holding device 200, and the program providing device 300 are collectively referred to as the "device".

That is, the device can be implemented by execution of a program corresponding to processing performed by the device by use of hardware resources such as a CPU and a memory built in the computer. The above program can be stored and distributed by being recorded in a computer-readable recording medium (portable memory or the like). In addition, the above program can also be provided through a network such as the Internet or an electronic mail.

Figure 10:
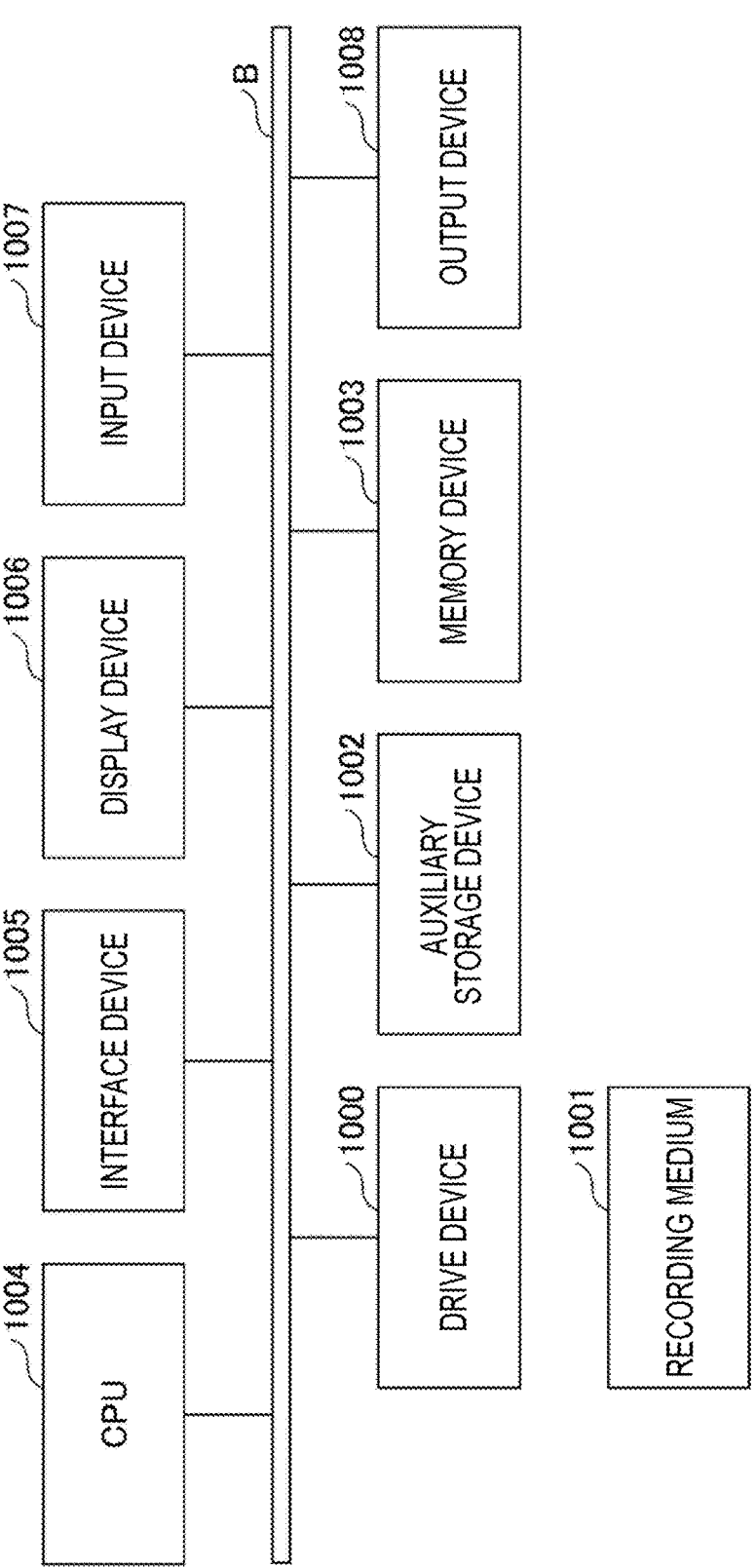
FIG. 10 is a diagram illustrating a hardware configuration example of a device.

FIG. 10 is a diagram illustrating a hardware configuration example of the above computer. The computer in FIG. 10 includes a drive device 1000, an auxiliary storage device 1002, a memory device 1003, a CPU 1004, an interface device 1005, a display device 1006, an input device 1007, an output device 1008, and the like that are connected with each other by a bus B. Note that some of these devices may not be included. For example, in a case where display is not to be performed, the display device 1006 may not be included.

The program for implementing the processing in the computer is provided by a recording medium 1001 such as a CD-ROM or a memory card. When the recording medium 1001 storing the program is set in the drive device 1000, the program is installed from the recording medium 1001 into the auxiliary storage device 1002 via the drive device 1000. Here, the program is not necessarily installed from the recording medium 1001 and may be downloaded from another computer via a network. The auxiliary storage device 1002 stores the installed program, and also stores necessary files, data, and the like.

In a case where an instruction is given to activate the program, the memory device 1003 reads the program from the auxiliary storage device 1002 and stores the program. The CPU 1004 implements a function related to the device in accordance with the program stored in the memory device 1003. The interface device 1005 is used as an interface for connection to a network, and functions as a transmission unit and a reception unit. The display device 1006 displays a graphical user interface (GUI) or the like according to the program. The input device 1007 includes a keyboard and a mouse, buttons, a touchscreen, or the like, and is used to input various operation instructions. The output device 1008 outputs a calculation result.
(Example of Application Field)

The technology described in the present embodiment can be applied to various use cases. Examples of use cases are listed as follows.

Traffic flow simulator (http://www.jste.or.jp/sim/models/index.html)

Human flow simulator (https://info.hitachi-ics.co.jp/product/h flow/)

Heart simulator (https://blog.global.fujitsu.com/jp/2018-05-10/01/)

Brain simulator (https://bicr.atr.jp/cbi/research-ja/%E8%84%B3%E6%B4%BB%E5%8B895%E8%A8%88%E6%B8%AC%E3883887%E 3883%BC %E3%82%BF%E3%82%B7%E3883%9F %E38838A5%E3%83%AC %E3%83% BC %E3%82%BF/)

Material physical properties simulator (https://www.jsol-cae.com/product/material/jocta/).

Robot simulator (http://www.idec-fs.com/robodk/)

FPGA simulator (https://www.intel.co.jp/content/www/jp/ja/software/program mable/quartus-prime/model-sim.html).

Space simulator (http://www.astro.phys.s.chiba-u.ac.jp/netlab/astro/index2.html)

Virtual pet (https://www.discoverychannel.jp/0000007144/)

Speech synthesis (https://cloud.google.com/text-to-speech?hl=ja)

Effects of Embodiment

As described above, according to the technology according to the present embodiment, there is provided a technology in which, in a case where data held by the data holder is processed by a program provided by the program provider by a data processing device including a secure computing mechanism, the program and the data are not leaked to the PF business operator, the data is not leaked to the program provider, the program is not leaked to the data holder, and access control according to a role can be performed.

Summary of Embodiment

The present specification discloses at least a program execution system, a data processing device, a program execution method, and a program described in the following clauses.

Clause 1

A program execution system including: a data holding device; a program providing device; and a data processing device including a mechanism that performs secret calculation in a secure area, in which:

the program providing device transmits an encrypted program obtained by encrypting a program P with a public key PKr1 corresponding to a first role to the data processing device;

the data holding device transmits encrypted data obtained by encrypting data D with a public key PKr2 corresponding to a second role to the data processing device;

the data processing device confirms whether or not the program providing device belongs to the first role, and generates a re-encrypted program obtained by re-encrypting the encrypted program with a public key PKp1 of the program providing device in a case where it is confirmed that the program providing device belongs to the first role;

the program providing device transmits a secret key SKp1 encrypted with a shared key Kp1 shared with the data processing device to the data processing device;

the data processing device confirms whether or not the data holding device belongs to the second role, and generates re-encrypted data obtained by re-encrypting the encrypted data with a public key PKd2 of the data holding device in a case where it is confirmed that the data holding device belongs to the second role;

the data holding device transmits a secret key SKd2 encrypted with a shared key Kd2 shared with the data processing device to the data processing device; and the data processing device calculates a result P(D) of executing the program P obtained by decrypting the re-encrypted program with the secret key SKp1 on the data D obtained by decrypting the re-encrypted data with the secret key SKd2, in the secure area.

Clause 2

The program execution system according to clause 1, in which the data processing device sets, as the secure area, a first encrypted container whose owner is a user of the program providing device, and calculates the result P(D) of executing the program P obtained by decrypting the re-encrypted program with the secret key SKp1 on the data D obtained by decrypting the re-encrypted data with the secret key SKd2, in the secure area.

Clause 3

The program execution system according to clause 1, in which the data processing device sets, as the secure area, a second encrypted container whose owner is a user having a relationship of trust with a user of the program providing device and a user of the data holding device, and calculates the result P(D) of executing the program P obtained by decrypting the re-encrypted program with the secret key SKp1 on the data D obtained by decrypting the re-encrypted data with the secret key SKd2, in the secure area.

Clause 4

The program execution system according to clause 3, in which the data processing device transmits, to the program providing device and the data holding device, a notification that a proposal of a policy for implementing access control to the second encrypted container is received, and in a case where permission for the policy is returned from the program providing device and the data holding device, performs access control in the second encrypted container according to the policy.

Clause 5

The program execution system according to any one of clauses 1 to 4, in which the data processing device confirms whether or not the program providing device belongs to the first role, on an encrypted container corresponding to the first role, and generates the re-encrypted program obtained by re-encrypting the encrypted program with the public key PKp1 of the program providing device in the case where it is confirmed that the program providing device belongs to the first role, and confirms whether or not the data holding device belongs to the second role, on an encrypted container corresponding to the second role, and generates the re-encrypted data obtained by re-encrypting the encrypted data with the public key PKd2 of the data holding device in the case where it is confirmed that the data holding device belongs to the second role.

Clause 6

A data processing device in a program execution system including: a data holding device; a program providing device; and a data processing device including a mechanism that performs secret calculation in a secure area, the data processing device:

receiving, from the program providing device, an encrypted program obtained by encrypting a program P with a public key PKr1 corresponding to a first role;

receiving, from the data holding device, encrypted data obtained by encrypting data D with a public key PKr2 corresponding to a second role;

confirming whether or not the program providing device belongs to the first role, and generating a re-encrypted program obtained by re-encrypting the encrypted program with a public key PKp1 of the program providing device in a case where it is confirmed that the program providing device belongs to the first role;

receiving, from the program providing device, a secret key SKp1 encrypted with a shared key Kp1 shared with the data processing device;

confirming whether or not the data holding device belongs to the second role, and generating re-encrypted data obtained by re-encrypting the encrypted data with a public key PKd2 of the data holding device in a case where it is confirmed that the data holding device belongs to the second role;

receiving, from the data holding device, a secret key SKd2 encrypted with a shared key Kd2 shared with the data processing device; and calculating a result P(D) of executing the program P obtained by decrypting the re-encrypted program with the secret key SKp1 on the data D obtained by decrypting the re-encrypted data with the secret key SKd2, in the secure area.

Item 7

A program execution method in a program execution system including: a data holding device; a program providing device; and a data processing device including a mechanism that performs secret calculation in a secure area, in which:

the program providing device transmits an encrypted program obtained by encrypting a program P with a public key PKr1 corresponding to a first role to the data processing device;

the data holding device transmits encrypted data obtained by encrypting data D with a public key PKr2 corresponding to a second role to the data processing device;

the data processing device confirms whether or not the program providing device belongs to the first role, and generates a re-encrypted program obtained by re-encrypting the encrypted program with a public key PKp1 of the program providing device in a case where it is confirmed that the program providing device belongs to the first role;

the program providing device transmits a secret key SKp1 encrypted with a shared key Kp1 shared with the data processing device to the data processing device;

the data processing device confirms whether or not the data holding device belongs to the second role, and generates re-encrypted data obtained by re-encrypting the encrypted data with a public key PKd2 of the data holding device in a case where it is confirmed that the data holding device belongs to the second role;

the data holding device transmits a secret key SKd2 encrypted with a shared key Kd2 shared with the data processing device to the data processing device; and the data processing device calculates a result P(D) of executing the program P obtained by decrypting the re-encrypted program with the secret key SKp1 on the data D obtained by decrypting the re-encrypted data with the secret key SKd2, in the secure area.

Clause 8

A program for causing a computer to function as the data processing device according to clause 6.

While the present embodiment has been described above, the present invention is not limited to such a specific embodiment, and various modifications and changes can be made within the scope of the spirit of the present invention described in the claims.

REFERENCE SIGNS LIST

100 Data processing device
110 Secure area
111 Secure data storage unit
112 Secure processing unit
120 Communication unit
130 Data storage unit
140 Data processing unit
200 Data holding device
300 Program providing device
400 Secure channel
1000 Drive device
1001 Recording medium
1002 Auxiliary storage device
1003 Memory device
1004 CPU
1005 Interface device
1006 Display device
1007 Input device
1008 Output device
B Bus

The invention claimed is:

1. A program execution system comprising:

a data holding device including first circuitry;

a program providing device including second circuitry; and a data processing apparatus including third circuitry configured to perform secret calculation in a secure area, wherein:

the second circuitry of the program providing device is configured to transmit, to the data processing apparatus, an encrypted program that is obtained by encrypting a program with a first public key, the first public key corresponding to a first role, the first circuitry of the data holding device is configured to transmit, to the data processing apparatus, encrypted data that is obtained by encrypting data with a second public key, the second public key corresponding to a second role, the third circuitry of the data processing apparatus is configured to confirm whether the program providing device belongs to the first role, and generate a re-encrypted program that is obtained by re-encrypting the encrypted program with a third public key for the program providing device, upon determining that the program providing device belongs to the first role, the second circuitry of the program providing device is configured to transmit, to the data processing apparatus, a first secret key encrypted with a first shared key, the first shared key being shared with the data processing apparatus, the third circuitry of the data processing apparatus is configured to confirm whether the data holding device belongs to the second role, and generate re-encrypted data that is obtained by re-encrypting the encrypted data with a fourth public key for the data holding device, upon determining that the data holding device belongs to the second role, the first circuitry of the data holding device is configured to transmit, to the data processing apparatus, a second secret key encrypted with a second shared key, the second shared key being shared with the data processing apparatus, and the third circuitry of the data processing apparatus is configured to calculate a result that is obtained by executing the program on the data in the secure area, the program being obtained by decrypting the re-encrypted program with the first secret key, and the data being obtained by decrypting the re-encrypted data with the second secret key.

2. The program execution system according to claim 1, wherein the third circuitry of the data processing apparatus is configured to set, as the secure area, a first encrypted container whose owner is a user of the program providing device, and calculate the result obtained by executing the program on the data in a set secure area.

3. The program execution system according to claim 1, wherein the third circuitry of the data processing apparatus is configured to set, as the secure area, a second encrypted container whose owner is a first user having a trusted relationship with a second user of the program providing device and a third user of the data holding device, and calculate the result obtained by executing the program on the data in a set secure area.

4. The program execution system according to claim 3, wherein the third circuitry of the data processing apparatus is configured to transmit, to the program providing device and the data holding device, information indicating that a proposal of a policy for controlling access to the second encrypted container is received, and control, upon occurrence of a condition in which a permission for the policy is sent from each of the program providing device and the data holding device, the access to the second encrypted container according to the policy.

5. The program execution system according to claim 1, wherein the third circuitry of the data processing apparatus is configured to confirm whether the program providing device belongs to the first role, on an encrypted container corresponding to the first role, generate the re-encrypted program obtained by re-encrypting the encrypted program with the first public key for the program providing device, upon determining that the program providing device belongs to the first role, confirm whether the data holding device belongs to the second role, on an encrypted container corresponding to the second role, and generate the re-encrypted data obtained by re-encrypting the encrypted data with the second public key for the data holding device, upon determining that the data holding device belongs to the second role.

6. A data processing apparatus in a program execution system including a data holding device, a program providing device, and the data processing apparatus configured to perform secret calculation in a secure area, the data processing apparatus comprising:

circuitry configured to perform receiving, from the program providing device, an encrypted program obtained by encrypting a program with a first public key, the first public key corresponding to a first role;

receiving, from the data holding device, encrypted data obtained by encrypting data with a second public key, the second public key corresponding to a second role;

confirming whether the program providing device belongs to the first role, and generating a re-encrypted program obtained by re-encrypting the encrypted program with a third public key for the program providing device, upon determining that the program providing device belongs to the first role;

receiving, from the program providing device, a first secret key encrypted with a first shared key, the first shared key being shared with the data processing apparatus;

confirming whether the data holding device belongs to the second role, and generating re-encrypted data obtained by re-encrypting the encrypted data with a fourth public key for the data holding device, upon determining that the data holding device belongs to the second role;

receiving, from the data holding device, a second secret key encrypted with a second shared key, the second shared key being shared with the data processing apparatus; and calculating a result that is obtained by of executing the program on the data in the secure area, the program being obtained by decrypting the re-encrypted program with the first secret key, and the data being obtained by decrypting the re-encrypted data with the second secret key.

7. A program execution method in a program execution system including a data holding device, a program providing device, and a data processing apparatus that performs secret calculation in a secure area, the program execution method comprising:

transmitting, by the program providing device, an encrypted program obtained by encrypting a program with a first public key, the first public key corresponding to a first role, and the encrypted program being transmitted to the data processing apparatus;

transmitting, by the data holding device, encrypted data that is obtained by encrypting data with a second public key, the second public key corresponding to a second role, and the encrypted data being transmitted to the data processing apparatus;

confirming, by the data processing apparatus, whether the program providing device belongs to the first role, and generating a re-encrypted program obtained by re-encrypting the encrypted program with a third public key for the program providing device, upon determining that the program providing device belongs to the first role;

transmitting, by the program providing device, a first secret key encrypted with a first shared key, the first shared key being shared with the data processing apparatus, and the first secret key being transmitted to the data processing apparatus;

confirming, by the data processing apparatus, whether the data holding device belongs to the second role, and generating re-encrypted data that is obtained by re-encrypting the encrypted data with a fourth public key for the data holding device, upon determining that the data holding device belongs to the second role;

transmitting, by the data holding device, a second secret key encrypted with a second shared key, the second shared key being shared with the data processing apparatus, and the second secret key being transmitted to the data processing apparatus; and calculating, by the data processing apparatus, a result that is obtained by executing the program on the data in the secure area, the program being obtained by decrypting 5 the re-encrypted program with the first secret key, and the data being obtained by decrypting the re-encrypted data with the second secret key.

8. A non-transitory computer readable storage medium storing a program for causing a computer to execute the 10 program execution method of claim 7.

\* \* \* \* \*